(12) United States Patent
Warren et al.

(10) Patent No.: US 6,414,682 B1
(45) Date of Patent: Jul. 2, 2002

(54) SYSTEM AND METHOD FOR TRANSITIONING BETWEEN TWO FILTERS, ALLOWING FOR THE USE OF HIGHER ORDER INTERPOLATION

(75) Inventors: David S. Warren, Mountain View; David L. Dignam, Belmont, both of CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/220,596

(22) Filed: Dec. 28, 1998

(51) Int. Cl.[7] .............................................. G06F 15/00
(52) U.S. Cl. ...................................................... 345/428
(58) Field of Search ................................ 345/418, 419, 345/427, 428, 429, 606, 607, 608, 609, 610

(56) References Cited

U.S. PATENT DOCUMENTS

| | | | |
|---|---|---|---|
| 4,703,439 A | 10/1987 | Lotz | 364/521 |
| 4,797,836 A | 1/1989 | Witek et al. | 364/518 |
| 5,113,455 A | 5/1992 | Scott | 382/47 |
| 5,696,892 A | 12/1997 | Redmann et al. | 395/125 |
| 5,844,562 A | 12/1998 | Harrison | 345/419 |
| 5,877,771 A | 3/1999 | Drebin et al. | 345/430 |
| 5,889,529 A | 3/1999 | Jones et al. | 345/439 |
| 5,973,701 A | 10/1999 | Vaswani | 345/430 |
| 5,977,977 A | 11/1999 | Kajiya et al. | 345/418 |
| 5,982,373 A | 11/1999 | Inman et al. | 345/419 |
| 6,232,974 B1 * | 5/2001 | Horvitz et al. | 345/419 |

OTHER PUBLICATIONS

Totsuka, T. and Levoy, M., "Frequency Domain Volume Rendering," Computer Graphics Proceedings, Annual Conference Series, 1993, pp. 271–278.

* cited by examiner

*Primary Examiner*—Phu K. Nguyen
(74) *Attorney, Agent, or Firm*—Woodcock Washburn LLP

(57) ABSTRACT

The present invention provides a system, apparatus and method for filtering an image that produces output images having high resolution without visual discontinuity across a wide range of resize ratios. The invention includes a linear filter for source images requiring low magnification and a higher order filter for source images requiring high magnification. In the transition region an interpolation is performed between the linear and higher order filters to provide a smooth transition in filtering and magnification to produce an output image.

25 Claims, 7 Drawing Sheets

SYSTEM AND METHOD FOR TRANSITIONING BETWEEN TWO FILTERS, ALLOWING FOR THE USE OF HIGHER ORDER INTERPOLATION

BACKGROUND OF THE INVENTION

1. Field of the Invention

This invention relates to computer graphics, and more specifically to a system, apparatus and method for gradually transitioning between a linear filter and a higher order filter that produces images having high resolution without visual discontinuity across a wide range of resize ratios.

2. Related Art

Many computer graphics applications require the generation of graphic images with a continuous and smooth visual effect while consistently maintaining high resolution for each output image. The generation of images in these applications must be at a constant frame rate to achieve the continuous visual effect. These applications include visual simulation and virtual reality in which the user operates in an interactive graphic environment. Specific environments include: pilot and driver training, medical and surgical preview, medical diagnosis and analysis, computer-aided design, and any other application where a user needs to walk-through or manipulate data. In these applications, the graphic images are an important feature of the system. Users require the images to be continuous with smooth transitions, while maintaining quality resolution, as they move their fields of vision.

Continuous graphic images are ensured when the computer system generates images at a constant frame rate. The system must process and generate each image within the time limit of one frame or field of video. The system cannot extend the processing of an image beyond the time limit of one frame without impacting the visual effect and generating a variable frame rate. When a system does not adhere to a constant frame rate, and generates images at a variable frame rate, the user is subject to sudden and abrupt image updates. Such spasmodic updates detract from the realism of the experience and are visually disturbing to the user. Therefore, a constant frame rate is required to achieve a realistic and effective interactive graphic environment.

Co-pending application Ser. No. 08/620,215 (entitled "Dynamic Image Resizing," filed Mar. 22, 1996) and co-pending Continuation-In-Part application Ser. No. 09/140,396 (entitled "System and Method For Combining Multiple Video Streams," filed Aug. 26, 1998), both of which are incorporated herein by reference, describe a video resizing technique that generates graphic images at a constant frame rate. This video resizing technique reduces the time it takes to generate a complex graphic image, thereby ensuring that the image is generated within the required frame rate. When more than one frame is needed to generate an image or when the computational time approaches the frame limit, the image size is simply reduced or resized, i.e., the number of pixels in the image is reduced. This reduction in an image's size also causes a reduction in the image's resolution.

A smaller version of the image requires less computational time for the video software to generate the image because the fill rate of the image, i.e., the time to draw the image, is proportional to the number of pixels in the image. Drawing at a reduced size or resolution can reduce the number of pixels per line, the number of lines of the image, or both. The fill demand is reduced by the proportion of pixels reduced. The video software draws a reduced image to a frame buffer. The reduced image is then sent through a filter to magnify it back up to its target size prior to sending it to the display device. The goal is that there be no perceptible difference between the original non-reduced image and the output image after resizing and filtering. While this video resizing technique generates complex graphic images within a single frame and ensures a constant frame rate, the quality of resolution for each output image may vary for reasons described below.

To ensure a continuous and smooth visual effect of displayed images during a simulation, the amount to reduce each image is determined on a frame by frame basis and synchronized with the display of each image. More complex original images must be reduced more, prior to storing them in the frame buffer, than less complex original images. Simple original images may not have to be reduced at all. Once a reduced image is stored in the frame buffer, the reduced image must then be magnified back up to its target size prior to displaying the output image, i.e., a filter can add pixels to the image. Therefore, each image may have associated with it a different resize ratio, where the resize ratio relates to the correspondence between the original image and the reduced image. This correspondence between the original image and the reduced image indicates how much the reduced image needs to be magnified back up to its target size prior to displaying the output image. For example, a simple original image that is not reduced at all will have a resize ratio of 1:1. Here, there is no need to use a filter to magnify, or take the reduced image back to its target size, prior to sending it to a display device.

Computer applications typically use a linear filter, to magnify the reduced image back to its target size prior to being displayed. Linear filters work best with images that have a resize ratio of close to 1:1. Therefore, linear filters work best with simple original images that require little or no magnification. Linear filters do not work as well with larger resize ratios, as would be required for complex original images. When a linear filter is used with a large resize ratio, the displayed output tends to appear blurred.

An alternative to a linear filter is a higher order filter. One example of a higher order filter is a cubic filter. A higher order filter will reduce the blurring problem that occurs at large resize ratios. However, when a cubic filter is used to magnify an image with a resize ratio close to 1:1, the output image appears sharpened. Edges that were subtle in the original image end up being more pronounced after resizing with a cubic filter. When a linear filter is used to filter all the images, simple images appear close to their original image, but the more complex images appear blurred. When a cubic filter is used to filter all the images, simple images appear sharper than their original image and complex images appear close to their original image. The goal is to produce output images that appear as close as possible to their original non-reduced image.

One approach to ensure as many output images as possible appear close to their original non-reduced images is to use a linear filter for images with small resize ratios and then switch to a cubic filter for images with large resize ratios. This is not a reasonable solution because when the switch is made from one filter to another the user will see a discontinuity or "pop" in the output image. Such discontinuities detract from the realism of the experience and are visually disturbing to the user. Therefore, what is needed is a filter that will produce acceptable results throughout a large range of magnification.

SUMMARY OF THE INVENTION

The present invention provides a system, apparatus and method for filtering an image that produces output images having high resolution without visual discontinuity across a wide range of resize ratios. The invention includes a linear filter for reduced images requiring low magnification and a higher order filter for source images requiring high magnification. In the transition region an interpolation is performed between the linear and higher order filters to provide a smooth transition in filtering and magnification to produce an output image.

Additional features of this invention will become apparent from the following detailed description of the best mode for carrying out the invention and from appended claims.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

The present invention is described in terms of an example environment. Description in these terms is provided for convenience only. It is not intended that the invention be limited to application in this example environment. In fact, after reading the following description, it will become apparent to a person skilled in the relevant art how to implement the invention in alternative environments.

Figure 1:
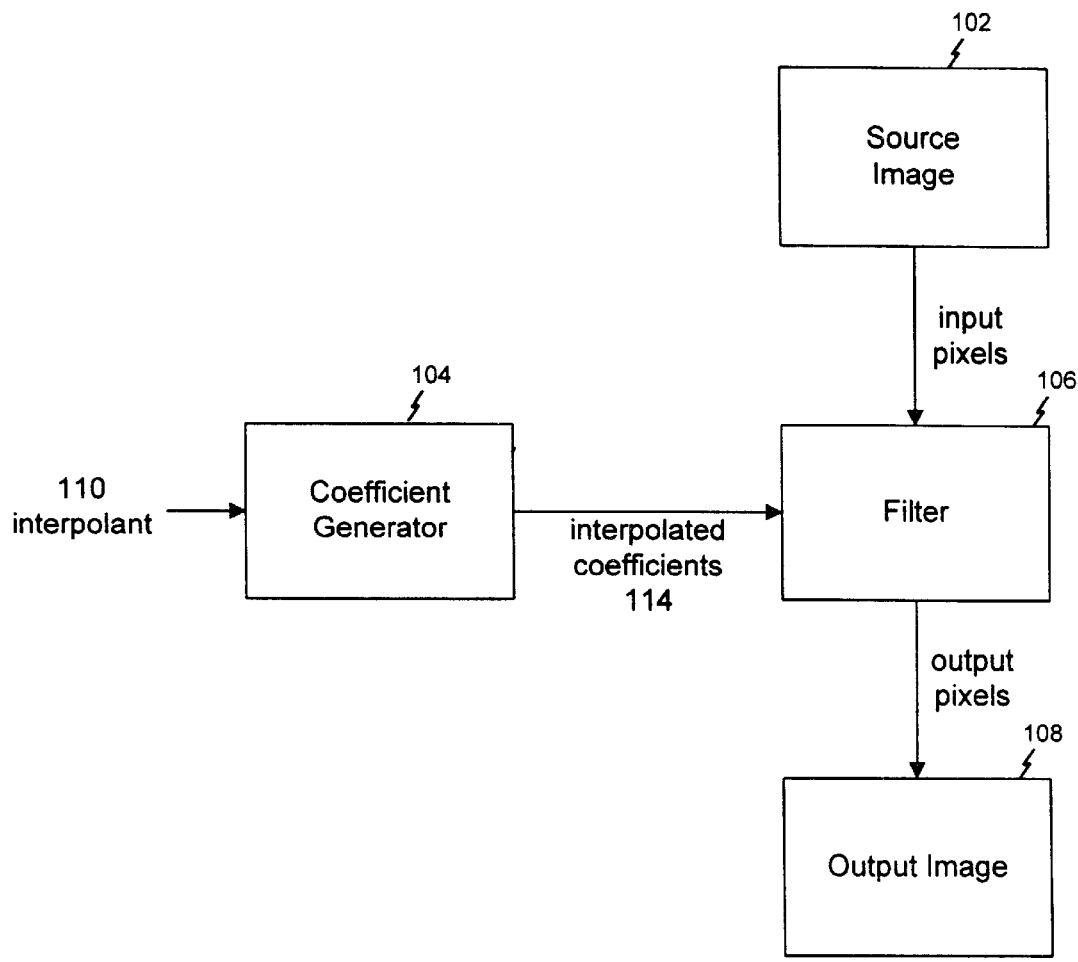
FIG. 1 is a block diagram illustrating an overview of the filter of the present invention.

FIG. 1 is a block diagram illustrating a system 100 for implementation of the filter of the present invention. System 100 includes a coefficient generator 104 and a filter 106. Coefficient generator 104 receives interpolant 110 and generates interpolated coefficients 114. Filter 106 receives interpolated coefficients 114 from coefficient generator 104. Filter 106 uses interpolated coefficients 114 to filter a source image 102 to produce an output image 108. Source image 102 is typically stored in multiple frame buffers. Source image 102 represents an original image after it has been reduced by the video resizing technique described above. Source images 102 have variable complexity and therefore have varying resize ratios associated with them. The resize ratio represents the ratio between the resolution of source image 102 and the resolution of output image 108.

Interpolant 110 represents a desired interpolation between a linear filter and a higher order filter to implement filter 106 of the present invention. The desired interpolation for filter 106 is accomplished when there is no perceptible difference between the original non-reduced image and its output image 108 after resizing and filtering. Interpolant 110 is determined based on the resize ratio of source image 102. For example, resize ratios that require a more magnification will result in interpolant values that give greater weight to the higher order filter rather than the linear filter. Conversely, resize ratios that require little magnification will result in interpolant values that give greater weight to the linear filter rather than the higher order filter.

Coefficient generator 104 samples an interpolated filter kernel to produce interpolated coefficients 114. Interpolated coefficients 114 and input pixels from source image 102 are provided to filter 106. Filter 106 filters each input pixel of source image 102 to produce output pixels of output image 108.

Figure 2:
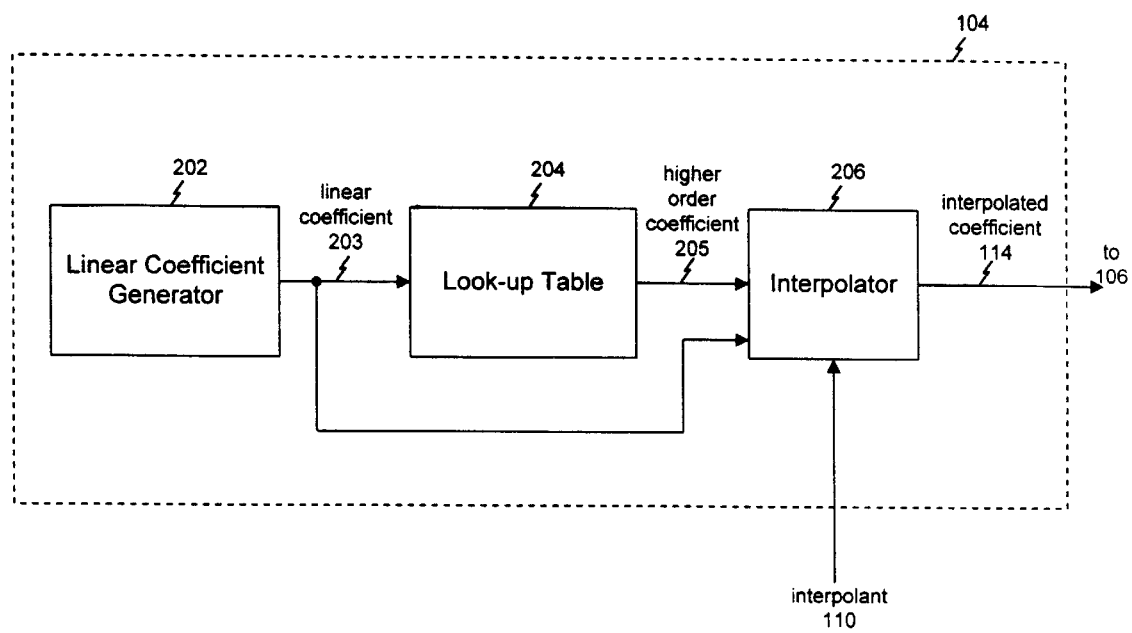
FIG. 2 is a block diagram illustrating a coefficient generator according to the present invention.

FIG. 2 is a block diagram illustrating coefficient generator 104 in more detail. Coefficient generator 104 of the present invention includes a linear coefficient generator 202, a look-up table 204 and an interpolator 206. Linear coefficient generator 202 samples a linear filter kernel and produces a linear coefficient 203. Linear coefficient 203 represents how much of the input pixel's intensity value contributes to the output pixel's intensity value if filter 106 is implement as a pure linear filter. Linear coefficient 203 is provided to look-up table 204 and interpolator 206. Look-up table 204 stores the representation of a higher order filter kernel. For example, if the higher order filter kernel is a cubic filter kernel then look-up table 204 stores one half of a sinc function representing the cubic filter kernel. Based on linear coefficient 203, look-up table produces a higher order coefficient 205. As with linear coefficient 203, higher order coefficient 205 can be produced by a higher order coefficient generator without the use of look-up table 204. Higher order coefficient 205 represents how much of the input pixel contributes to the output pixel if filter 106 is implemented as a pure higher order filter.

Higher order coefficient 205 is provided to interpolator 206. Interpolator 206 interpolates, using interpolant 110, between the linear and higher order filter to produce interpolated coefficient 114. Interpolated coefficient 114 represents how much of the input pixel's intensity value contributes to the output pixel's intensity value if filter 106 is implemented as an interpolation of linear and higher order filters. As indicated in FIG. 2, interpolated coefficient 114 is provided to filter 106.

Figure 5:
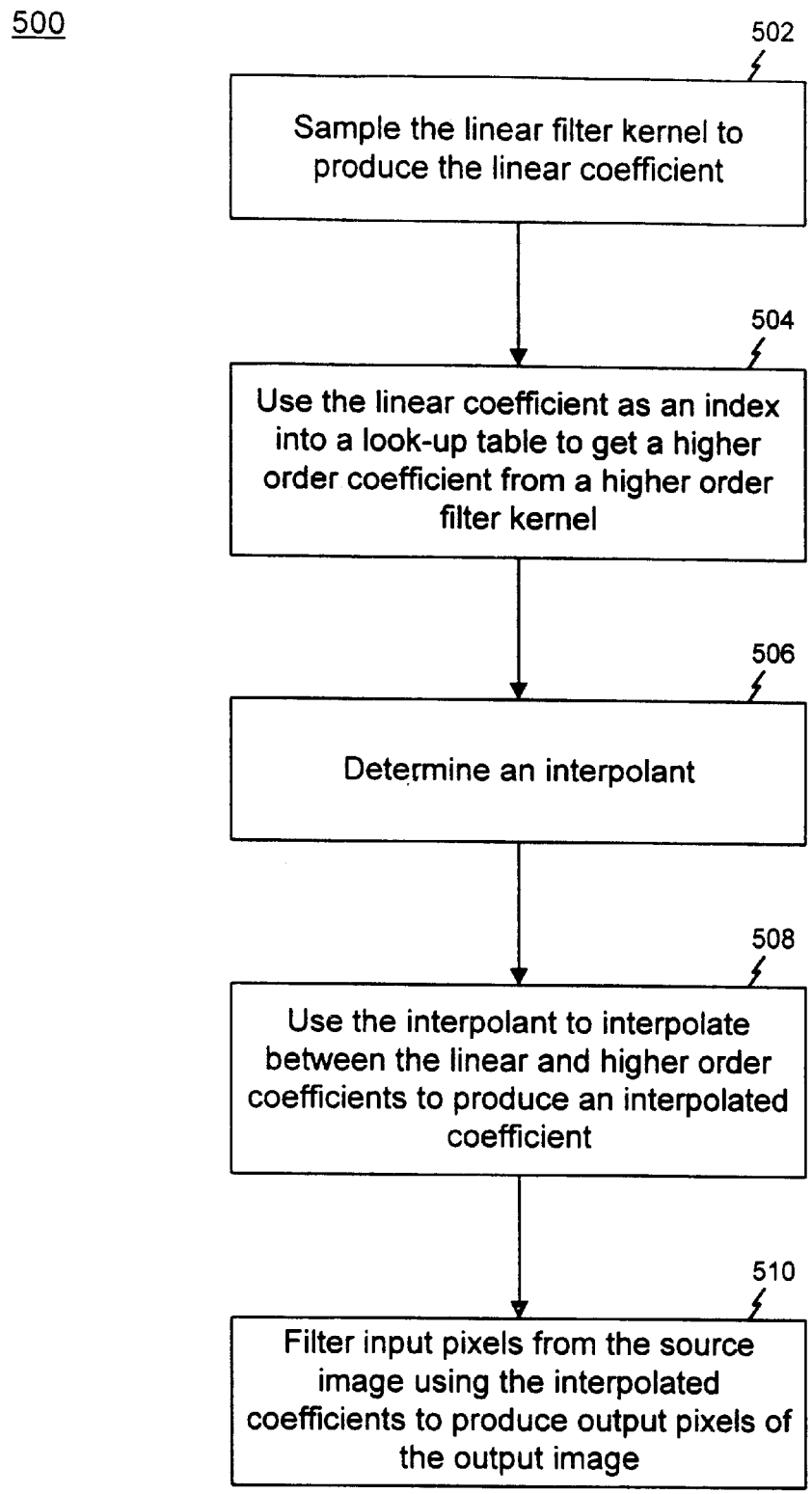
FIG. 5 is a flow chart illustrating the general flow of filtering according to the present invention.

The relationship between linear coefficient generator 202, look-up table 204 and interpolator 206 in implementing coefficient generator 104 can better be described by referring to FIG. 5. Flowchart 500, of FIG. 5, illustrates the general flow of filtering according to the present invention. In step 502, the linear filter kernel is sampled to produce linear coefficient 203 while taking into account the position of the current input pixel in relation to the position of the output pixel. In step 504, linear coefficient 203 is provided to look-up table 204. Linear coefficient 203 is then used as an index into look-up table 204 to determine higher order coefficient 205. In step 504, the process of using linear coefficient 203 as an index into look-up table 204 is the same as sampling the higher order filter kernel to produce higher order coefficient 205 of FIG. 2. As with the linear filter kernel, the higher order filter kernel can also be sampled directly without the use of look-up table 204. Also, as with the linear filter kernel, the higher order filter kernel is sampled while taking into account the position of the current input pixel in relation to the position of the output pixel. As discussed above, higher order coefficient 205 represents how much of the input pixel's intensity value contributes to the output pixel's intensity value if filter 106 is implemented as a pure higher order filter.

In step 506, interpolant 110 of FIG. 1 is determined. Interpolant 110 uses the resize ratio of each source image 102 to determine the desired interpolation between the linear and higher order filters to implement filter 106. The desired interpolation for filter 106 is accomplished when there is no perceptible difference between the original non-reduced image and its output image 108 after resizing and filtering.

In step 508, interpolator 206 (see FIG. 2) interpolates between the linear and higher order filter kernels by using interpolant 110 to determine how much of linear coefficient 203 and how much of higher order coefficient 205 to use to produce interpolated coefficient 114. For example, if the original image is simple then its source image 102 will be identical to the original image. This means that its resize ratio will be 1:1 and therefore all of linear coefficient 203 and none of higher order coefficient 205 will be used to create interpolated coefficient 114. The effect of using only linear coefficient 203 to make up interpolated coefficient 114 is that filter 106 is implemented as a pure linear filter.

The more complex the original image is, the larger its resize ratio will be. Therefore, as complexity of the image increases so does the amount of higher order coefficient 205 used to create interpolated coefficient 114. Once the original image reaches a certain complexity, then all of higher order coefficient 205 and none of linear coefficient 203 is used to create interpolated coefficient 114. The effect of using all of higher order coefficient 205 to make up interpolated coefficient 114 is that filter 106 is implemented as a pure higher order filter. As the required magnification increases, to go from source image 102 to output image 108, the higher order filter is phased in to take advantage of its higher performance when filtering complex images.

Finally, in step 510, interpolated coefficient 114 is used to filter input pixels of source image 102 to produce output pixels of output image 108.

Figure 3:
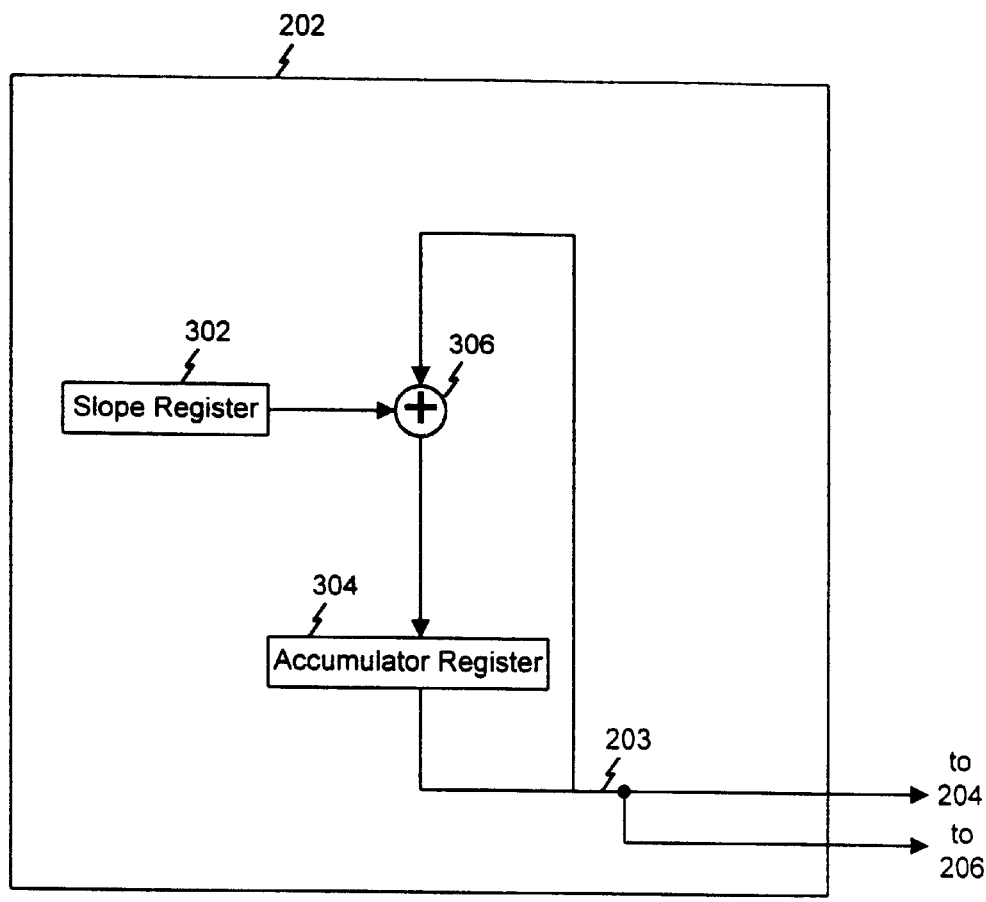
FIG. 3 is a block diagram illustrating a linear coefficient generator according to the present invention.

FIG. 3 is a block diagram illustrating linear coefficient generator 202 of FIG. 2. Linear coefficient generator 202 includes a slope register 302, an accumulator register 304 and an adder 306. As discussed above, the effect of linear coefficient generator 202 is to sample the linear filter kernel and to produce linear coefficient 203. Linear coefficient 203 represents how much of the input pixel's intensity value contributes to the output pixel's intensity if filter 106 is implemented as a pure linear filter.

The resize ratio of the current source image 102 directly determines the value loaded into slope register 302. Accumulator register 304 gets loaded with an initial seed value. The initial seed value is based on the relative positioning of the input and output pixels. The values in accumulator register 304 and slope register 302 are provided to adder 306. Adder 306 adds the values from registers 302 and 304 and places the sum in accumulator register 304. The value in accumulator register 304 represents linear coefficient 203.

Multiple linear coefficients 203 can be produced for each input pixel. Each time accumulator register 304 is clocked, its value is incremented by the value in slope register 302 and a linear coefficient 203 is produced. Once the value of accumulator register 304 reaches or exceeds a predetermined maximum value, linear coefficient generator 202 has completed processing the present input pixel and is prepared to process the next input pixel in the present scan line. Preparation for the next pixel in the scan line involves subtracting a predetermined value from accumulator register 304. After the subtraction, the value remaining in accumulator register 304 acts as the seed value for processing of the linear coefficient for the next pixel.

Figure 6:
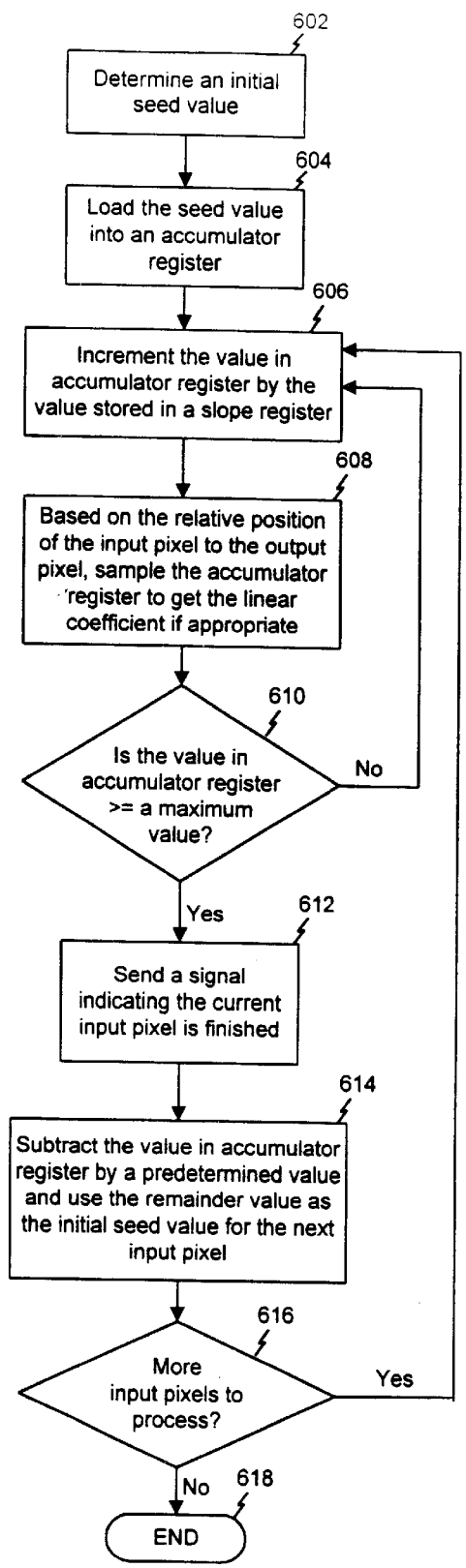
FIG. 6 is a flow chart illustrating the process of generating linear coefficients from a linear filter kernel according to the present invention.

The relationship between slope register 302 and accumulator register 304 in implementing linear coefficient generator 202 can better be described by referring to FIG. 6. Flowchart 600, of FIG. 6, illustrates the process of generating linear coefficients 203 from a linear filter kernel according to the present invention. In step 602, an initial seed value is determined based on the relative position of the input pixel in relation to the output pixel. In step 604, the seed value is loaded into accumulator register 304. Accumulator register 304 gets incremented by the value in slope register 302 in step 606. As described above, the value in slope register 302 is directly determined by the resize ratio of the current source image 102.

In step 608, based on the relative position of the input pixel to the output pixel, if appropriate, accumulator register 304 gets sampled to yield linear coefficient 203. In step 610, the value in accumulator register 304 gets compared to a maximum value. Therefore, if the value in accumulator register 304 is less than the maximum value, then coefficient generator 202 has not completed determining how much the current input pixel's intensity value contributes to an output pixel's intensity value. If the value in accumulator register 304 is less than the maximum value in step 608, then control gets sent back to step 606 and the value in accumulator register 304 gets incremented by the value in slope register 302 again. Steps 608 and 606 are repeated until the value in accumulator register 304 is greater than or equal to the maximum value.

In step 610, when the value of accumulator register 304 is greater than or equal to the maximum value, then linear coefficient generator 202 is finished with the current input pixel and is ready for the next input pixel. At this point, control transfers to step 612. In step 612, a signal is sent indicating linear coefficient generator 202 is finished with the current input pixel. In step 614, a predetermined value is subtracted from accumulator register 304. The value remaining in accumulator register 304 after the subtraction is used as the initial seed value for the next input pixel. The process of generating linear coefficients 203 from a linear filter kernel in FIG. 6 is repeated until all the input pixels from source image 102 have been processed. Therefore, in step 616, if more input pixels need to be processed, then control transfers to step 606. Alternatively, if all of the input pixels have been processed, then flowchart 600 ends at step 618.

Figure 4:
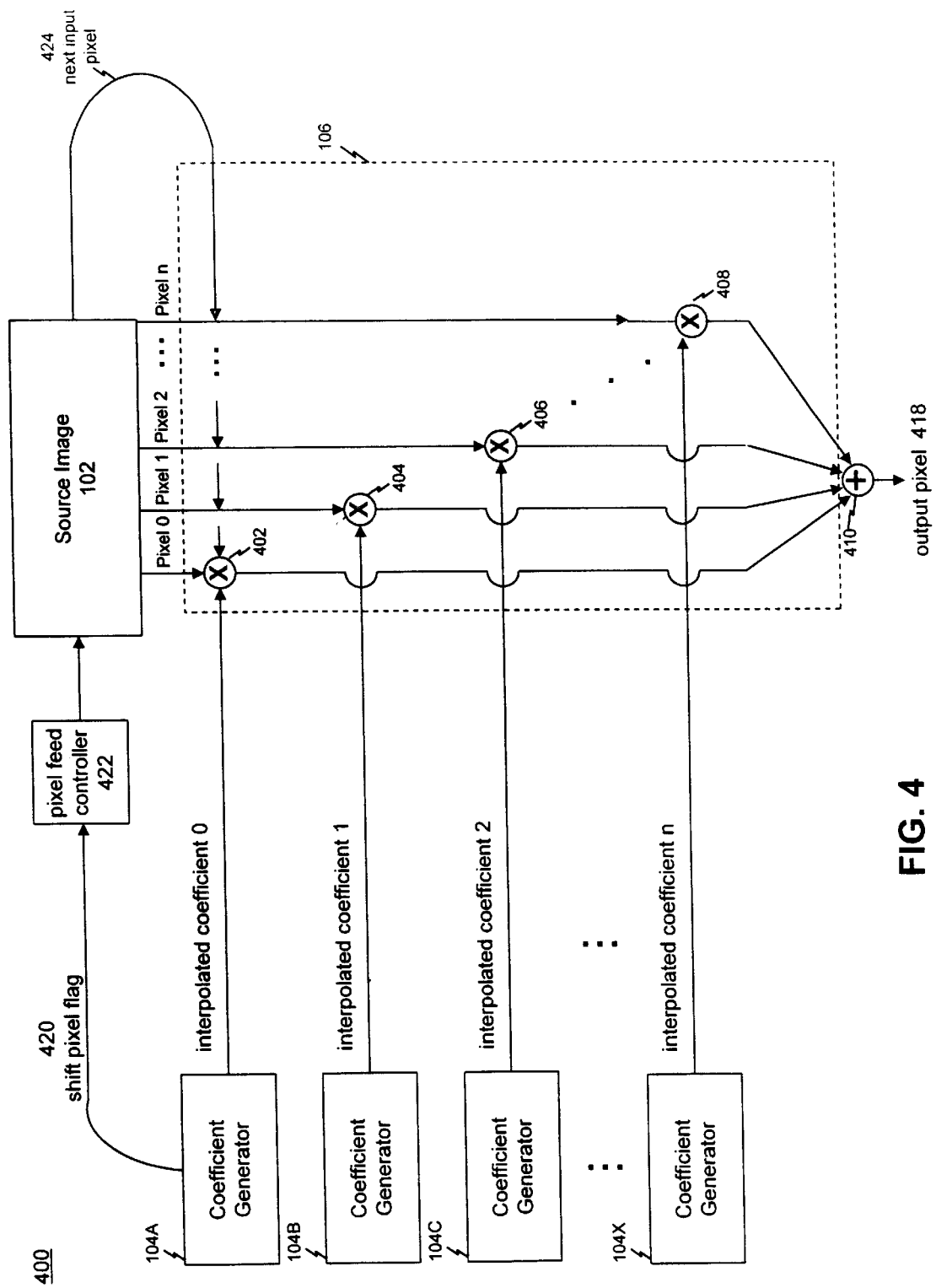
FIG. 4 is a block diagram illustrating how multiple interpolated coefficients are used to implement the filter of the present invention.

FIG. 4 is a block diagram 400 illustrating how multiple interpolated coefficients 114 are used to implement filter 106 of the present invention. Block diagram 400 illustrates that n pixels, pixel 0 through pixel n, are received from source image 102. The higher order filter kernel determines the number of input pixels required to calculate the intensity of the output pixel. For example, if the higher order filter kernel is a cubic filter kernel, then four pixels will be filtered to yield the intensity of the output pixel.

As depicted in FIG. 4, there is one coefficient generator 104 for every input pixel being processed. In FIG. 4, coefficient generator 104A produces interpolated coefficient 0, coefficient generator 104B produces interpolated coefficient 1, coefficient generator 104C produces interpolated coefficient 2 and coefficient generator 104X produces interpolated coefficient n. In a preferred embodiment of the present invention, only two coefficient generators 104 are used to generate four interpolated coefficients.

Referring again to FIG. 4, filter 106 includes multipliers 402–408 and adder 410. Interpolated coefficients 0–n and pixels 0–n are provided to filter 106. Values for pixel 0 through pixel n represent each pixel's intensity. As discussed above, the value for interpolated coefficient 0 through interpolated coefficient n represents how much the intensity values of pixels 0–n contribute to the intensity value of output pixel 418, respectively.

In FIG. 4, filter 106 multiples, in parallel, interpolated coefficient 0 by pixel 0 using multiplier 402, interpolated coefficient 1 by pixel 1 using multiplier 404, interpolated coefficient 2 by pixel 2 using multiplier 406 and interpolated coefficient n by pixel n using multiplier 408. The outputs of multipliers 402 through 408 are provided to adder 410 to produce the intensity value for output pixel 418.

Coefficient generator 104A in FIG. 4 is adapted to perform an additional function. Coefficient generator 104A also produces shift pixel flag 420 that is provided to pixel feed controller 422. Shift pixel flag 420 signals pixel feed controller 422 when coefficient generator 104A is finished with the current input pixel. In the example in FIG. 4, the current input pixel is pixel 0. Pixel feed controller 422 then shifts the input pixels being retrieved from source image 102. The next input pixel 424 gets shifted into the place of pixel n, pixel n gets shifted into the place of pixel n−1, as so fourth, until pixel 2 gets shifted into the place of pixel 1 and pixel 1 gets shifted into the place of pixel 0. This shift of pixels, illustrated in FIG. 4, is done in preparation to determine the intensity value for the next output pixel by filter 106. The process in FIG. 4 continues until there are no more input pixels to process in source image 102

Figure 7:
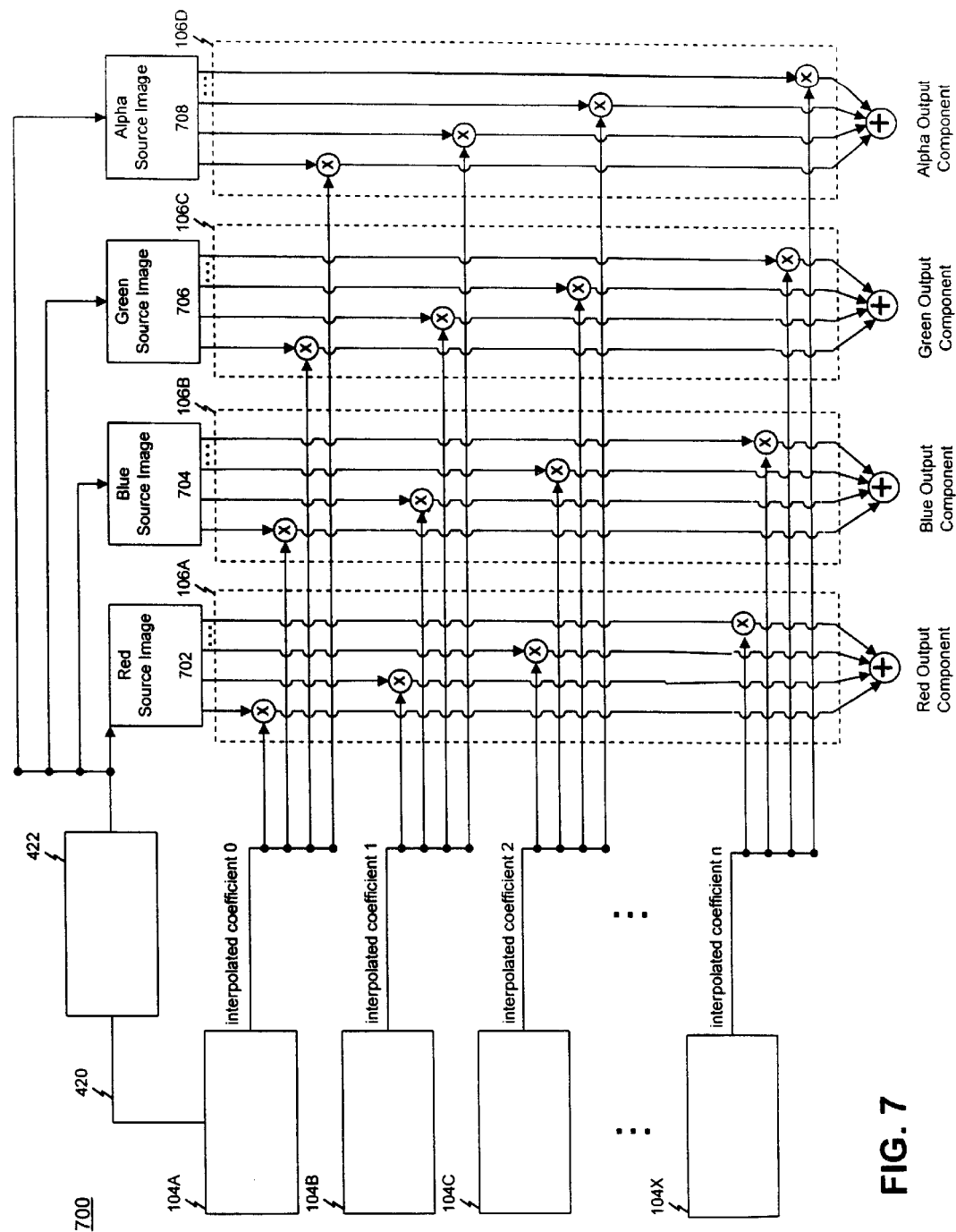
FIG. 7 is a block diagram illustrating in more detail how multiple interpolated coefficients are used to implement the filter of the present invention.

FIG. 7 is a block diagram 700 illustrating in more detail how interpolated coefficient 0 through interpolated coefficient n are used to implement filter 106 of the present invention. As discussed above, source image 102, of FIG. 1, is typically stored in multiple frame buffers. FIG. 7 illustrates that source image 102 is effectively made up of four source sub-images. The four source sub-images are: red source image 702, blue source image 704, green source image 706 and alpha source image 708. Alpha source image 708 represents the translucency of the input pixel. Source image 702 through source image 708 are each stored in their own frame buffer.

In FIG. 7, each source image 702 through source image 708 is associated with a corresponding filter 106A through filter 106D. Interpolated coefficient 0 through interpolated coefficient n are each provided to a corresponding filter 106A through filter 106D. Filter 106A filters pixels from red source image 702 to produce an intensity value for red output component 710, as described in FIG. 4. In a similar manner, filter 106B filters pixels from blue source image 704 to produce an intensity value for blue output component 712, filter 106C filters pixels from green source image 706 to produce an intensity value for green output component 714 and filter 106D filters pixels from alpha source image 708 to produce an intensity value for alpha output component 716. Output component 710 through output component 716 all work together to produce output image 108 from FIG. 1.

Finally, in FIG. 7, shift pixel flag 420 from coefficient generator 104A is provided to pixel feed controller 422, as described in FIG.4. Pixel feed controller 422 then indicates when to shift the input pixels outputted by red source image 702, blue source image 704, green source image 706 and alpha source image 708.

While various embodiments of the present invention have been described above, it should be understood that they have been presented by the way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for transitioning between a first filter and a second filter while filtering input pixels from a source image to produce output pixels for an output image, wherein the output image is a representation of the entire source image, comprising the steps of:

determining, based on a desired resize ratio related to the representation, an interpolant to be used to interpolate between first coefficients from a first filter kernel and second coefficients from a second filter kernel;

using said interpolant to interpolate between said first and second coefficients to produce interpolated coefficients;

using said interpolated coefficients to implement an interpolated filter; and filtering the input pixels, using said interpolated filter, to produce the output pixels, thereby producing output images having high resolution without visual discontinuity across a wide rang of resize ratios.

2. The method of claim 1, wherein said first filter kernel is a linear filter kernel and said first coefficients are linear coefficients.

3. The method of claim 2, wherein said second filter kernel is a higher order filter kernel and said second coefficients are higher order coefficients.

4. The method of claim 3, further comprising the steps of:

producing said linear coefficient from said linear filter kernel; and producing said higher order coefficient from said higher order filter kernel.

5. The method of claim 4, wherein said step of producing said linear coefficient comprises the step of:

sampling said linear filter kernel based on a position of the input pixel with respect to the output pixel, said sampling producing said linear coefficient.

6. The method of claim 5 wherein said step of sampling said linear filter kernel comprises the steps of:

determining a seed value based on said position of the input pixel with respect to the output pixel;

loading said seed value into an accumulated value;

producing said linear coefficient by incrementing said accumulated value by said slope value until said accumulated value is greater than or equal to a maximum value;

subtracting said accumulated value by a predetermined value to produce a remainder value; and using said remainder value as said seed value for the next input pixel.

7. The method of claim 4, wherein said step of producing said higher order coefficient comprises the step of:

sampling said higher order filter kernel based on a position of the input pixel with respect to the output pixel, said sampling producing said higher order coefficient.

8. The method of claim 7, wherein said step of sampling said higher order coefficient comprises the step of:

using said linear coefficient as an index into a look-up table to produce said higher order coefficient.

9. The method of claim 8, wherein said look-up table stores one half of a sinc function representing said higher order filter kernel.

10. The method of claim 1, wherein said filtering step comprises, for each output pixel, the steps of:
- identifying the input pixels that contribute to an intensity value for the output pixel;
- for each input pixel identified in said identifying step, multiplying an intensity value for the input pixel by said interpolated coefficient that corresponds to the input pixel to determine the contribution of said input pixel's intensity value to said output pixel's intensity value; and
- summing the contributions of the input pixels identified in said identifying step to yield said output pixel's intensity value.

11. An apparatus for transitioning between a first filter and a second filter while filtering input pixels from a reduced input image to produce output pixels for an output image, wherein the output image is a representation of the entire source image, comprising:
- a first coefficient generator for implementing a first filter kernel by producing first coefficients;
- a second coefficient generator for implementing a second filter kernel by producing second coefficients; and
- an interpolator for implementing an interpolated filter by interpolating between said first coefficients and said second coefficients, based on a desired resize ratio related to the representation, to produce interpolated coefficients;
- wherein said interpolated filter is used for filtering the input pixels, using said interpolated coefficients, to produce the output pixels, thereby producing output images having high resolution without visual discontinuity across a wide range of resize ratios.

12. The apparatus of claim 11, wherein said first coefficient generator is a linear coefficient generator, said first filter kernel is a linear filter kernel and said first coefficient is a linear coefficient.

13. The apparatus of claim 12, wherein said second coefficient generator is a higher order coefficient generator, said second filter kernel is a higher order filter kernel and said second coefficient is a higher order coefficient.

14. The apparatus of claim 13, wherein said higher order coefficient generator comprises a look-up table, wherein said linear coefficient is used as an index into said look-up table to produce said higher order coefficient.

15. The apparatus of claim 14, wherein said look-up table stores one half of a sinc function representing said higher order filter kernel.

16. A system for transitioning between a first filter and a second filter while filtering input pixels from a source image to produce output pixels for an output image, wherein the output image is a representation of the entire source image, comprising:
- means for determining, based on a desired resize ratio related to the representation, an interpolant to be used to interpolate between first coefficients from a first filter kernel and second coefficients from a second filter kernel;
- means for using said interpolant to interpolate between said first and second coefficient to produce interpolated coefficients;
- means for using said interpolated coefficients to create an interpolated filter; and
- means for filtering the input pixels, using said interpolated filter, to produce the output pixels, thereby producing output images having high resolution without visual discontinuity across a wide range of resize ratios.

17. The system of claim 16, wherein said first filter kernel is a linear filter kernel and said first coefficients are linear coefficients.

18. The system of claim 17, wherein said second filter kernel is a higher order filter kernel and said second coefficients are higher order coefficients.

19. The system of claim 18, further comprising:
- means for producing said linear coefficient from said linear filter kernel; and
- means for producing said higher order coefficient from said higher order filter kernel.

20. The system of claim 19, wherein said means for producing said linear coefficient comprises:
- means for sampling said linear filter kernel based on a position of the input pixel with respect to the output pixel, said sample representing said linear coefficient.

21. The system of claim 20, wherein said means for sampling said linear filter kernel comprises:
- means for determining a seed value based on said position of the input pixel with respect to the output pixel;
- means for loading said seed value into an accumulated value;
- means for producing said linear coefficient by incrementing said accumulated value by said slope value until said accumulated value is greater than or equal to a maximum value;
- means for subtracting said accumulated value by a predetermined value to produce a remainder value; and
- means for using said remainder value as said seed value for the next input pixel.

22. The system of claim 19, wherein said means for producing said higher order coefficient comprises:
- means for sampling said higher order filter kernel based on a position of the input pixel with respect to the output pixel, said sample representing said higher order coefficient.

23. The system of claim 22, wherein said means for sampling said higher order coefficient comprises:
- means for using said linear coefficient as an index into a look-up table to produce said higher order coefficient.

24. The system of claim 23, wherein said look-up table stores one half of a sinc function representing said higher order filter kernel.

25. The system of claim 16, wherein said filtering, for each output pixel, comprises:
- means for identifying the input pixels that contribute to an intensity value for the output pixel;
- for each input pixel identified in said identifying step, means for multiplying an intensity value for the input pixel by said interpolated coefficient that corresponds to the input pixel to determine the contribution of said input pixel's intensity value to said output pixel's intensity value; and
- means for summing the contributions of the input pixels identified in said identifying step to yield said output pixel's intensity value.

* * * * *